(12) United States Patent
Halder et al.

(10) Patent No.: US 11,750,139 B2
(45) Date of Patent: Sep. 5, 2023

(54) METHOD AND SYSTEM FOR OPERATING A SYSTEM INCLUDING AN ENERGY STORAGE DEVICE AND RESISTOR

(71) Applicant: SEW-EURODRIVE GMBH & CO. KG, Bruchsal (DE)

(72) Inventors: Wolfgang Halder, Leutkirch (DE); Thomas Kühefuß, Schlier (DE); Georg Pfeiffer, Berg (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 17/627,916

(22) PCT Filed: Jun. 25, 2020

(86) PCT No.: PCT/EP2020/025301
§ 371 (c)(1),
(2) Date: Jan. 18, 2022

(87) PCT Pub. No.: WO2021/008727
PCT Pub. Date: Jan. 21, 2021

(65) Prior Publication Data
US 2022/0278639 A1 Sep. 1, 2022

(30) Foreign Application Priority Data

Jul. 18, 2019 (DE) ..................... 10 2019 004 983.7

(51) Int. Cl.
*H02P 29/00* (2016.01)
*H02P 29/032* (2016.01)
(Continued)

(52) U.S. Cl.
CPC ............ *H02P 29/0022* (2013.01); *H02P 3/22* (2013.01); *H02P 27/085* (2013.01);
(Continued)

(58) Field of Classification Search
CPC ...... H02P 29/0022; H02P 3/22; H02P 27/085; H02P 29/032; H02P 29/68; H02P 2201/09; H02P 29/60; Y02T 10/64; B60L 7/08
(Continued)

(56) References Cited

U.S. PATENT DOCUMENTS 8,054,031 B2 * 11/2011 Uechi ................. B60W 30/192
                                                          318/376
9,461,567 B2 * 10/2016 Matsushita ............. H02P 27/06
10,298,155 B2 * 5/2019 Lee ........................... H02P 3/22
(Continued)

FOREIGN PATENT DOCUMENTS

DE     102011075509 A1    11/2012
EP        2405565 A1      1/2012
(Continued)

OTHER PUBLICATIONS

International Preliminary Report on Patentability issued in corresponding International Application No. PCT/EP2020/025301 dated Jan. 28, 2022, pp. 1-23, English Translation.
(Continued)

*Primary Examiner* — David Luo
(74) *Attorney, Agent, or Firm* — CARTER, DELUCA & FARRELL LLP

(57) ABSTRACT

In a method and system for operating a system having an energy storage device and a resistor, and in order to discharge the energy storage device, an electric power that is constant over time is continuously supplied to the resistor, e.g., during a time period, e.g., until the resistor has practically been fully discharged, the time period, e.g., being greater than the time constant of the temperature rise of the resistor induced by a continuous electric power that is constant over time and supplied to the resistor.

25 Claims, 1 Drawing Sheet

(51) Int. Cl.
*H02P 29/68* (2016.01)
*H02P 3/22* (2006.01)
*H02P 27/08* (2006.01)

(52) U.S. Cl.
CPC ............ *H02P 29/032* (2016.02); *H02P 29/68* (2016.02); *H02P 2201/09* (2013.01)

(58) Field of Classification Search
USPC ........................................ 318/273, 255, 269
See application file for complete search history.

(56) References Cited

U.S. PATENT DOCUMENTS

| 10,873,266 | B2 | 12/2020 | Stark |
| 10,951,126 | B2 | 3/2021 | Schmidt et al. |
| 2005/0001635 | A1 | 1/2005 | Shigeru |
| 2012/0003821 | A1 | 1/2012 | Keiichi |

FOREIGN PATENT DOCUMENTS

| EP | 2684732 | A1 | 1/2014 |
| JP | 3792964 | B2 | 7/2006 |
| WO | 2014154317 | A2 | 10/2014 |
| WO | 2017194196 | A1 | 11/2017 |
| WO | 2018054543 | A1 | 3/2018 |

OTHER PUBLICATIONS

International Search Report issued in corresponding International Application No. PCT/EP2020/025301 dated Jan. 11, 2021, pp. 1-4, English Translation.

Klohr, M. et al., "Energiespeicher auf Strassen—und Stadtbahnfahrzeugen—das erste Serienprojekt" Eb-Elektrische Bahnen (Aug. 2012) pp. 444-451, vol. 110. No. 8-9, English-language abstract provided.

* cited by examiner

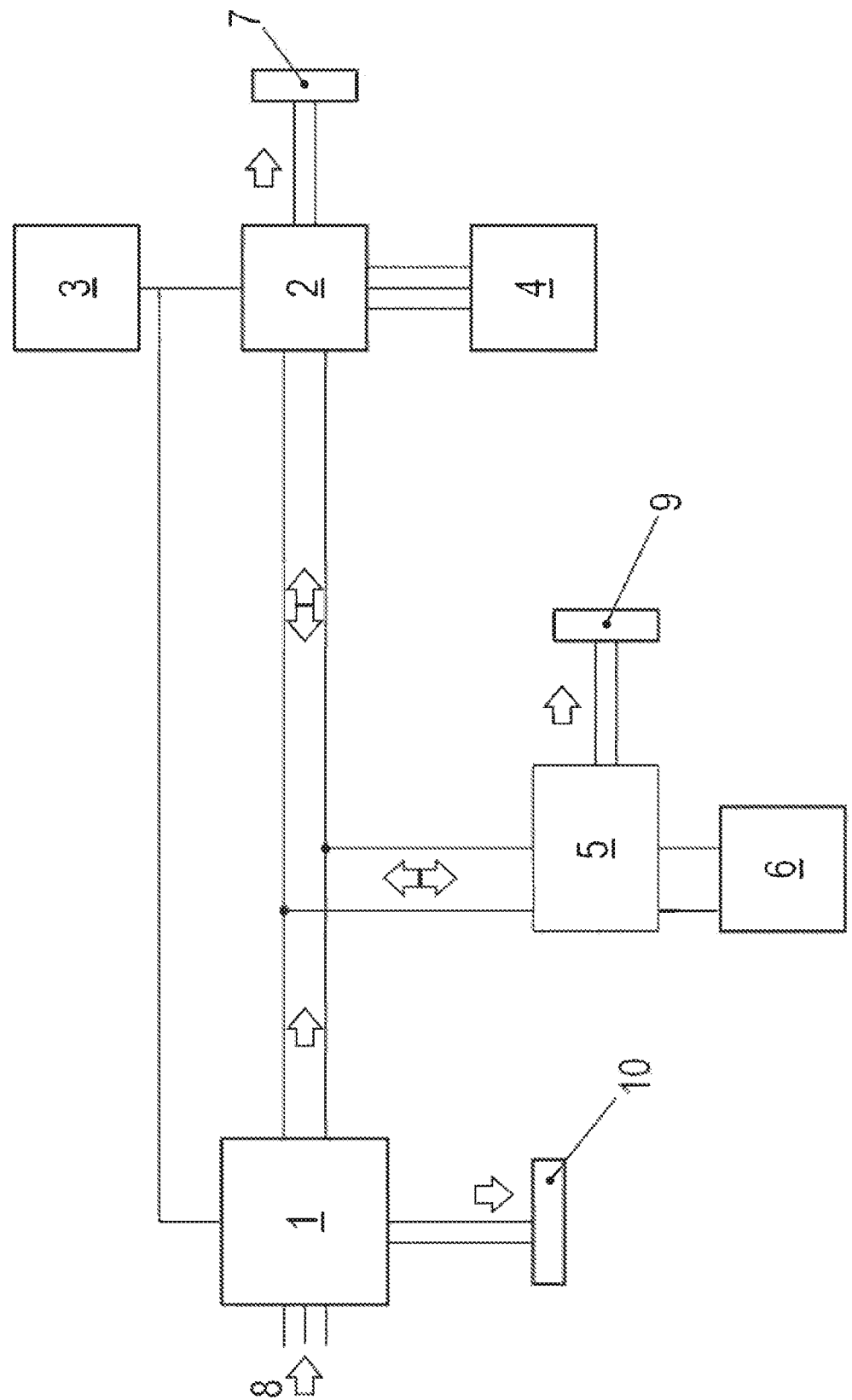

METHOD AND SYSTEM FOR OPERATING A SYSTEM INCLUDING AN ENERGY STORAGE DEVICE AND RESISTOR

FIELD OF THE INVENTION

The present invention relates to a method and system for operating a system having an energy storage device and resistor.

BACKGROUND INFORMATION

In certain conventional systems, brake resistors are used to reduce the energy produced in the generator-mode operation of electric motors in order to prevent the generation of dangerously high voltages.

SUMMARY

Example embodiments of the present invention provide for ensuring the safety of a system having an energy storage device.

According to an example embodiment of the present invention, in a method for operating a system having an energy storage device and a resistor, in order to discharge the energy storage device, an electric power P that is constant over time is continuously supplied to resistor R, e.g., during a time period T, e.g., until the resistor has practically been fully discharged, time period T, for example, being greater than the time constant of the temperature rise of resistor R induced by a continuous electric power that is constant over time and supplied to the resistor.

The temperature rise can be described by a first order differential equation and illustrates the behavior of a PT1 element.

This has the advantage that power is applied to the resistor not only briefly for lowering the intermediate circuit voltage but continuously using the highest possible power P. This power is, e.g., so high that it falls just short of destroying the resistor. Thus, the maximally permissible power is able to be continuously dissipated into the environment in the form of heat. With the aid of this method, the lowest possible resistance value may be used, which means that a rapid discharge of the energy storage device is able to be carried out. Such discharges are important in a transport case and also a maintenance case.

According to example embodiments, voltage U is acquired which is applied at a series circuit that includes the resistor and a controllable semiconductor switch, e.g., a brake chopper, the series circuit is fed either directly from the voltage supplied by the energy storage device or via a DC/DC converter from the voltage supplied by the energy storage device, a pulse width modulated actuation signal having a pulse width modulation ratio as a function of the acquired voltage is supplied to the controllable semiconductor switch, the pulse width modulation ratio, for example, being determined according to the relationship $(1/U)*(P*R)^{1/2}$. This has the advantage that the pulse width modulation ratio is modified as a function of the voltage, e.g., increased as the voltage drops.

According to example embodiments, the controllable semiconductor switch is continuously closed when voltage U drops below a threshold value, the threshold value, e.g., $(P*R)^{1/2}$. An especially rapid deep discharge is possible when the power maximally conveyable to the resistor is within the permissible range. Thus, a pulse width modulation is avoided.

According to example embodiments, the system has a supply module which includes a mains-operated rectifier and whose DC-voltage-side terminal is connected to the DC-voltage-side terminal of an inverter and to the first terminal of a DC/DC converter, the second terminal of the DC/DC converter is connected to the terminal of the energy storage device supplying voltage U, and an electric motor, e.g., a three-phase motor, is connected at the AC-voltage-side terminal of the inverter. This offers the advantage that the system has an energy storage device which buffers energy of the electric motor generated in a generator mode operation and thus minimizes the power supply from the AC voltage supply network in a power drain by the motor from the intermediate circuit.

According to example embodiments, a DC/DC actuator is situated between the DC-voltage-side terminal of the rectifier and the DC-voltage-side terminal of the supply module, which stops the power flow from the rectifier to the series circuit that includes resistor R and a controllable semiconductor switch during the discharging of the energy storage device, e.g., so that during the discharge, heat is generated on the particular power module on which the diodes of the rectifier and the controllable semiconductor switch are situated in an integrated fashion, either by the controllable semiconductor switch or alternatively by the diodes of the rectifier. This offers the advantage that the power flow from the AC voltage supply network to the intermediate circuit can be interrupted. This is important especially during the discharging.

According to example embodiments, the inverter has a power module on which controllable semiconductor switches arranged in half bridges are situated. This offers the advantage that the controllable semiconductor switches are able to be arranged as power switches yet are still able to be arranged in a structurally integrated form, i.e., on a shared carrier.

According to example embodiments, power P is lower than the power maximally recoverable by the electric motor via the inverter to the DC-voltage-side terminal of the inverter in a generator-mode operation of the electric motor. This offers the advantage that a continuously constant power is able to be dissipated with the aid of the energy storage device, but excess energy in a generator-mode operation has to be stored in the energy storage device.

According to example embodiments, the pulse width modulation frequency of the actuation signal is varied while power P is supplied, e.g., during time period T, different values, e.g., discrete values, being used successively in time as a pulse width modulation frequency. This offers the advantage that the noise emission can be reduced or at least no mono-frequency sound be heard and the sound energy instead is able to be distributed to different frequencies. This makes the sound impression more acceptable.

According to example embodiments, current I flowing through resistor R is acquired, and the instantaneous resistance value of the brake resistor is determined from the time-averaged voltage supplied via the brake chopper and the time-averaged current, e.g., according to U/I, and instantaneous temperature T of the respective brake resistor is determined under consideration of a characteristic curve that represents the temperature dependency of the brake resistor. This offers the advantage that the temperature is able to be ascertained from the determined voltage and the determined current.

According to example embodiments, it is monitored whether determined temperature T of the brake resistor exceeds a threshold value, and more particularly, an emergency shut-off of the brake chopper takes place after an exceedance. This has the advantage that a destruction of the brake resistor is able to be avoided.

According to example embodiments, the determined temperature is controlled to a setpoint temperature in that power P is appropriately adjusted as an actuation value of a controller, e.g., a PI controller. This offers the advantage that a maximum power is able to be dissipated from the energy storage device into the environment even if the ambient temperature has changed.

According to an example embodiment of the present invention, in a system, e.g., for carrying out the method described herein, the system has a supply module which includes a mains-operated rectifier and whose DC-voltage-side terminal is connected to the DC-voltage-side terminal of an inverter of the system and to the first DC-voltage-side terminal of a DC/DC converter of the system, the second DC-voltage-side terminal of the DC/DC converter is connected to the energy storage device, e.g., an accumulator system and/or a dual-layer capacitor system and/or an ultracap system, and an electric motor, e.g., a three-phase motor, is connected at the AC-voltage-side terminal of the inverter. This offers the advantage that the energy storage device can be discharged for transport or servicing purposes. This discharging can be carried out rapidly because a very low Ohmic resistance value may be used. This is because the acquisition of the voltage applied at the series circuit makes it possible to dissipate a constant power to the resistor using a suitable pulse width modulation, and a rapid discharge is able to be carried out even at low voltages.

According to example embodiments, a DC/DC actuator is situated between the DC-voltage-side terminal of the rectifier and the DC-voltage-side terminal of the supply module. This offers the advantage that the power flow from the rectifier to the intermediate circuit is able to be influenced, e.g., switched off. In addition, the voltage level present at the DC-voltage-side terminal of the rectifier differs from the intermediate circuit level, that is to say, the level of the voltage at the DC-voltage-side terminal of the inverter or the supply module.

According to example embodiments, a controllable semiconductor switch connected in series with the brake resistor is situated in the housing of the DC/DC converter. This has the advantage that the controllable semiconductor switch is implementable in integrated form with the other electronics of the DC/DC converter and may also be cooled thereby.

According to example embodiments, a controllable semiconductor switch connected in series with the brake resistor is integrated on a power module, which has diodes arranged in half bridges and/or controllable semiconductor switches. This offers the advantage that the rectifier is integrated with the controllable semiconductor switch and that they may thus be cooled together. However, since the power flow from the rectifier to the intermediate circuit is stopped by the converter, e.g., cut off, when the energy storage device is discharged with the aid of the resistor, e.g., the brake resistor, the power losses of the diodes of the rectifier and the power loss of the controllable semiconductor switch occur only alternatively.

According to example embodiments, the power module is situated in the housing of the inverter or the supply module. This has the advantage that the controllable semiconductor switch may be arranged in the power module in an integrated fashion so that the cooling of the controllable power module can be carried out by the cooling of the power module, e.g., with the aid of a heat sink which dissipates into the environment the lost heat of the controllable semiconductor switches of the inverter arranged in half bridges and the controllable semiconductor switches assigned to the resistor.

Further features and aspects of example embodiments of the present invention are described in greater detail below with reference to the appended schematic FIGURE.

BRIEF DESCRIPTION OF THE DRAWING

FIG. 1 schematically illustrates a system according to an example embodiment of the present invention.

DETAILED DESCRIPTION

As schematically illustrated in FIG. 1, a supply module 1 supplied by an AC voltage supply network 8 delivers a unipolar voltage at its DC-voltage-side terminal.

The DC-voltage-side terminal of an inverter 2 is connected to this terminal, and at the AC-voltage-side terminal of inverter 2, inverter 2 supplies a three-phase voltage to an electric motor 4, e.g., an AC motor, a three-phase motor, etc.

The inverter is actuated by a control electronics 3, control electronics 3, for example, generating pulse width modulated actuation signals for the controllable semiconductor switches of the inverter which are arranged in half bridges and switched in parallel with one another, this parallel circuit of half bridges being supplyable from the unipolar voltage.

The semiconductor switches, i.e., for example, six controllable semiconductor switches, are integrated on a module on which a further controllable semiconductor switch, which may be referred to as a brake chopper, is integrated as well.

The brake chopper is connected in series with a resistor which may be denoted as a brake resistor 7, and this series circuit is likewise supplyable from the unipolar voltage.

A terminal of a DC/DC converter 5 is also connected to the DC-voltage-side terminal of supply module 1 so that this DC/DC converter 5 is switched in parallel with inverter 2.

An energy storage device 6 is connected at the other terminal of DC/DC converter 5. DC/DC converter 5 thus allows for a power flow from energy storage device 6 to the intermediate circuit having the unipolar voltage or vice versa, even if the amount of the unipolar voltage differs significantly from the amount of the voltage applied at energy storage device 6.

Energy storage device 6 is implementable as an electrolyte capacitor system, as a dual-layer capacitor system, and/or, e.g., as an accumulator system.

Supply module 1 may be arranged as a mains-operated rectifier. However, a DC/DC actuator is, for example, situated between the mains-operated rectifier and the DC-voltage-side terminal of supply module 1 so that the power flow from the AC-voltage supply network 8 into the intermediate circuit is controllable.

The rectifier, for example, has a module again on which the diodes of the rectifier are disposed in an integrated fashion and on which a further controllable semiconductor switch is additionally integrated, which may be denoted as a brake chopper.

The brake chopper is connected in series with a further resistor 10, which may be referred to as a brake resistor, and this series circuit is likewise supplyable from the DC-voltage-side terminal of the rectifier.

DC/DC converter 5 also includes a further controllable semiconductor switch, which may be referred to as a brake chopper.

This brake chopper is connected in series with a further resistor 9, which may be referred to as a brake resistor, and this series circuit is also supplyable from the DC-voltage-side terminal of the rectifier or from the voltage applied at energy storage device 6.

A plurality of brake choppers may thus be provided in the system.

According to example embodiments of the present invention, the safety of the system is increased in that the discharging of the energy storage device can be carried out in a controlled manner.

This is important not only when the energy storage device is transported but also when maintenance work is performed on the system and the energy storage device is to be discharged. Moreover, a discharge is also important in special types of energy storage devices when a memory effect is to be prevented. NiCd accumulators, for instance, are discharged at regular time intervals.

The discharging hereof takes place such that the brake chopper of the respective brake resistor (7, 9, 10) is actuated as a function of the unipolar voltage or the voltage U applied at the series circuit that includes the brake resistor and the associated brake chopper, such that a constant power is continuously supplied to the respective brake resistor R.

This electric power P continuously supplied to the respective brake resistor until the energy storage device is practically completely discharged is specified to be as high as possible. It therefore, for example, equals the nominal power of brake resistor R.

For this purpose, voltage U is acquired and the respective brake chopper is actuated, e.g., with the aid of a pulse width modulation ratio $(1/U)*(P*R)^{1/2}$. The power supplied to the respective brake resistor thereby remains constant even given a dropping voltage U.

The nominal power, i.e., also power P, e.g., is lower than the power maximally recoverable by electric motor 4 via inverter 2 in a generator-mode operation of the electric motor.

The Ohmic resistance of respective brake resistor R may thus be selected to be very low and a practically complete discharge may therefore be obtained within a short time.

If the voltage drops below a threshold value, the pulse width modulation may even be replaced by a continuous closing of the controllable switch. This allows for a particularly rapid deep discharge. As soon as the voltage then drops below a second, even lower threshold value, the switch is opened again so that the destruction of accumulator cells is prevented.

In the described manner, energy from the intermediate circuit thus is convertible into heat via the brake resistors (7, 9, 10).

If the series circuit that includes brake resistor 9 and its allocated brake chopper is fed directly from the voltage applied at the energy storage device, a simple deep discharge of the energy storage device is readily possible because the DC/DC converter is unable to operate without a minimum voltage, which means that no discharge through brake resistors 7 and 10 can be carried out below the minimum voltage. This is because the series circuit formed by the respective brake chopper and brake resistor 7 or 10 is supplied only indirectly via DC/DC converter 5 from the energy storage device.

When the energy storage device is discharged, the supply module is unable to conduct electric power from the AC voltage supply network to the intermediate circuit.

In further exemplary embodiments, the current flowing through the respective brake resistor is acquired and the instantaneous resistance value of the brake resistor is determined from the time-averaged voltage supplied via the brake chopper and also from the acquired time-averaged current, and the instantaneous temperature of the respective brake resistor is determined under consideration of a characteristic curve, which represents the temperature dependency of the brake resistor.

On the one hand, it may thus be monitored whether the temperature of the brake resistor exceeds a threshold value and an emergency shut-off of the brake chopper is therefore required. On the other hand, it is alternatively possible to set a power that is adapted to the determined temperature. This means that power P is adjusted to the temperature. As a result, a change in the ambient temperature or a worsening of the heat transfer resistance effective from the brake resistor to the environment is able to be taken into account.

In further exemplary embodiments, no constant pulse width modulation frequency is used, but the pulse width modulation frequency instead is varied intermittently or continuously. This makes it possible to achieve a less interfering noise emission.

LIST OF REFERENCE NUMERALS

1 supply module
2 inverter
3 control electronics
4 electric motor
5 DC/DC converter
6 energy storage device
7 brake resistor
8 AC voltage supply network
9 brake resistor
10 brake resistor Claims 1 to 15. (Canceled).

The invention claimed is:

1. A method for operating a system that includes an energy storage device and a resistor, comprising:
continuously supplying an electric power, that is constant over time, to the resistor to discharge the energy storage device.

2. The method according to claim 1, wherein the electric power is continuously supplied to the resistor during a time period that is greater than a time constant of a temperature rise of the resistor induced by the continuous supply of electric power that is constant over time and supplied to the resistor.

3. The method according to claim 1, wherein the electric power is continuously supplied to the resistor until the resistor has been substantially fully discharged.

4. The method according to claim 1, further comprising:
acquiring a voltage applied at a series circuit that includes the resistor and a controllable semiconductor switch, the series circuit being fed directly from a voltage supplied by the energy storage device and/or via a DC/DC converter from the voltage supplied by the energy storage device; and
conveying, to the controllable semiconductor switch, a pulse width modulated actuation signal having a pulse width modulation ratio as a function of a value of the acquired voltage.

5. The method according to claim 4, wherein a pulse width modulation ratio corresponding to $(1/U)*(P*R)^{-1/2}$, U representing the acquired voltage, P representing the power that is constant over time, R representing resistance of the resistor, the controllable semiconductor switch being continuously closed in response to the acquired dropping below a threshold value.

6. The method according to claim 5, wherein the threshold value corresponds to $(P*R)^{1/2}$.

7. The method according to claim 4, wherein the controllable semiconductor switch includes a brake chopper.

8. The method according to claim 4, wherein a pulse width modulation frequency of the actuation signal is varied while the power is supplied, and values, different values, and/or discrete values are used successively in time as the pulse width modulation frequency.

9. The method according to claim 1, wherein the system includes a supply module that includes a mains-operated rectifier and whose DC-voltage-side terminal is connected to a DC-voltage-side terminal of an inverter and to a first terminal of a DC/DC converter, a second terminal of the DC/DC converter being connected to a terminal of the energy storage device supplying the voltage, an electric motor and/or a three-phase motor being connected at an AC-voltage-side terminal of the inverter.

10. The method according to claim 9, wherein a DC/DC actuator is arranged between the DC-voltage-side terminal of the rectifier and the DC-voltage-side terminal of the supply module, which stops a power flow from the rectifier to a series circuit that includes the resistor R and a controllable semiconductor switch during discharging of the energy storage device.

11. The method according to claim 10, wherein, during the discharging, heat is generated on a particular power module on which diodes of the rectifier and the controllable semiconductor switch are arranged in an integrated fashion, by the controllable semiconductor switch and/or by the diodes of the rectifier.

12. The method according to claim 9, wherein the inverter includes a power module on which controllable semiconductor switches arranged in half bridges are arranged.

13. The method according to claim 9, wherein the power is lower than a power maximally recoverable by the electric motor via the inverter to the DC-voltage-side terminal of the inverter in a generator-mode operation of the electric motor.

14. The method according to claim 1, further comprising acquiring current flowing through the resistor, determining an instantaneous resistance value of the resistor from a time-averaged voltage supplied via a brake chopper and the time-averaged current, and determining an instantaneous temperature of the under consideration of a characteristics curve that represents a temperature dependency of the resistor.

15. The method according to claim 14, further comprising monitoring whether the determined temperature of the resistor exceeds a threshold value, and performing an emergency shutoff of the brake chopper in response to the determined temperature of the resistor exceeding the threshold value.

16. The method according to claim 14, wherein the determined temperature is controlled to a setpoint temperature by setting the power as an actuation value of a controller and/or a PI controller.

17. The method according to claim 1, wherein the system includes:
an inverter;
a DC/DC converter;
a supply module that includes a mains-operated rectifier and whose DC-voltage-side terminal is connected to a DC-voltage-side terminal of the inverter and to a first DC-voltage-side terminal of the DC/DC converter, a second DC-voltage-side terminal of the DC/DC converter being connected to the energy storage device; and
an electric motor and/or a three-phase motor connected at an AC-voltage-side terminal of the inverter.

18. A system, comprising:
an energy storage device;
an inverter;
a DC/DC converter;
a supply module that includes a mains-operated rectifier and whose DC-voltage-side terminal is connected to a DC-voltage-side terminal of the inverter and to a first DC-voltage-side terminal of the DC/DC converter, a second DC-voltage-side terminal of the DC/DC converter being connected to the energy storage device; and
an electric motor and/or a three-phase motor connected at an AC-voltage-side terminal of the inverter;
wherein the system is adapted to perform the method recited in claim 1.

19. A system, comprising:
an energy storage device;
an inverter;
a DC/DC converter;
a supply module that includes a mains-operated rectifier and whose DC-voltage-side terminal is connected to a DC-voltage-side terminal of the inverter and to a first DC-voltage-side terminal of the DC/DC converter, a second DC-voltage-side terminal of the DC/DC converter being connected to the energy storage device;
an electric motor and/or a three-phase motor connected at an AC-voltage-side terminal of the inverter; and
control electronics adapted to continuously supply an electric power, that is constant over time, to a resistor connected to the energy storage device to discharge the energy storage device.

20. The system according to claim 19, wherein the energy storage device includes an accumulator system, a dual-layer capacitor system, and/or an ultracap system.

21. The system according to claim 19, wherein a DC/DC actuator is arranged between a DC-voltage-side terminal of a rectifier and the DC-voltage-side terminal of the supply module.

22. The system according to claim 19, wherein a controllable semiconductor switch arranged in series with a brake resistor is arranged in a housing of the DC/DC converter.

23. The system according to claim 19, wherein a controllable semiconductor switch arranged in series with a brake resistor is integrated on a power module that includes diodes arranged in half bridges and/or controllable semiconductor switches.

24. The system according to claim 23, wherein the power module is arranged in a housing of the inverter or the supply module.

25. The system according to claim 19, wherein the system includes a resistor and is adapted to perform a method that includes continuously supplying an electric power, that is constant over time, to the resistor to discharge the energy storage device.

* * * * *